(12) United States Patent
Baldwin et al.

(10) Patent No.: US 8,340,645 B2
(45) Date of Patent: Dec. 25, 2012

(54) USER-CONTROLLED ROUTING OF PHONE CALLS TO VOICEMAIL

(75) Inventors: James A. Baldwin, Redwood City, CA (US); Shaheedur R. Haque, London (GB)

(73) Assignee: Microsoft Corporation, Redmond, WA (US)

( * ) Notice: Subject to any disclaimer, the term of this patent is extended or adjusted under 35 U.S.C. 154(b) by 846 days.

(21) Appl. No.: 12/343,747

(22) Filed: Dec. 24, 2008

(65) Prior Publication Data

US 2010/0159893 A1 Jun. 24, 2010

(51) Int. Cl.
*H04M 11/10* (2006.01)
(52) U.S. Cl. .... 455/413; 455/502; 455/41.2; 455/456.1; 455/415; 455/557; 455/404.2; 455/414.1; 370/392; 370/338
(58) Field of Classification Search ............. 379/207.02, 379/212.01, 211.02, 227, 87, 114.01, 142.17, 379/218.01; 370/400, 318; 455/567, 69, 455/127.1, 574, 413
See application file for complete search history.

(56) References Cited

U.S. PATENT DOCUMENTS

| | | | |
|---|---|---|---|
| 6,026,155 A * | 2/2000 | Takeuchi et al. | 379/212.01 |
| 6,853,713 B1 | 2/2005 | Fobert et al. | |
| 7,277,445 B2 | 10/2007 | Bartfeld et al. | |
| 7,570,975 B2 * | 8/2009 | Oprescu-Surcobe et al. | 455/574 |
| 2001/0038690 A1 | 11/2001 | Palmer et al. | |
| 2001/0043687 A1 | 11/2001 | Tidwell et al. | |
| 2002/0147983 A1 | 10/2002 | Michael et al. | |
| 2006/0045101 A1 * | 3/2006 | Cachin | 370/400 |
| 2006/0085832 A1 | 4/2006 | Groff et al. | |
| 2006/0159239 A1 * | 7/2006 | Hughes, Jr. | 379/87 |
| 2007/0010287 A1 * | 1/2007 | Hara et al. | 455/556.1 |
| 2007/0036286 A1 * | 2/2007 | Champlin et al. | 379/67.1 |
| 2007/0043872 A1 * | 2/2007 | Pattan et al. | 709/227 |
| 2007/0091836 A1 * | 4/2007 | Oprescu-Surcobe et al. | 370/318 |
| 2007/0213100 A1 * | 9/2007 | Osann, Jr. | 455/567 |
| 2008/0123829 A1 * | 5/2008 | Smith et al. | 379/142.17 |
| 2009/0034707 A1 * | 2/2009 | Li | 379/207.02 |

OTHER PUBLICATIONS

"Delivering Composite Services and Extending Communications to Your Television", Retrieved at<<http://www1.alcatel-lucent.com/com/en/appcontent/opgss/5900%20evolution%20data%20Sheet_1p02_tcm228-1289631635.pdf>>, pp. 14.
Sims David,"Know Thy Keynoters: Ken Epps of BayPackets", Retrieved at<<http://www.tmcnet.com/tmcnet/articles/2005/ken-epps-baypackets-speaker-internet-telephony-voip-conference.htm>>, Feb. 21, 2005, pp. 1-4.
"Torando M20 IP Video Phone", Retrieved at<<http://www.sysmaster.com/brochures/tornado_m20.pdf>>, pp. 2.
"Introduction to IPTV", Retrieved at<<http://www.nortel.com/solutions/iptv/collateral/nn113800.pdf>>, pp. 1-10.

* cited by examiner

*Primary Examiner* — Joseph Arevalo
(74) *Attorney, Agent, or Firm* — Wolfe-SBMC (57) ABSTRACT

In accordance with one or more aspects, a notification of an incoming phone call is received from a phone system. An indication of the incoming phone call is presented to a user, and the user can control the incoming phone call in different manners. The user can request to delay routing the incoming phone call to voicemail, to route the incoming phone call to voicemail without further delay, and to stop ringing of one or more phone handsets of the phone system. One or more of these control requests can be input by the user via a mobile phone and/or a television system.

17 Claims, 5 Drawing Sheets

USER-CONTROLLED ROUTING OF PHONE CALLS TO VOICEMAIL

BACKGROUND

Telephones have become commonplace in homes and other locations throughout the world. As technology has advanced, various features have been incorporated into telephones. One such feature is voicemail, which allows a calling party to leave a voice message for subsequent retrieval by the called party. Voicemail features are typically configured to stop ringing the telephone and record the calling party's voice message after the telephone has rung a particular number of times (such as after four rings). However, this particular number of times is oftentimes insufficient for the called party to easily get to his or her telephone. This can be problematic as it can decrease the usability of the telephone and can increase user frustration.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a notification of an incoming phone call is received from a phone system, and a user request to delay the incoming phone call being routed to voicemail is received. A request to delay routing the incoming phone call to voicemail is sent to the phone system.

In accordance with one or more aspects, a television system includes a phone system interface module, a user interface module, and an input module. The phone system interface module communicates with a phone system located at a same location as the television system, and receives a notification of an incoming phone call from the phone system. The user interface module displays, in response to receiving the notification of the incoming phone call, an indication of the incoming phone call. The input module receives a user request to route the incoming phone call straight to voicemail, and communicates to the phone system via the phone system interface module a request to route the incoming phone call to voicemail without further delay.

BRIEF DESCRIPTION OF THE DRAWINGS

The same numbers are used throughout the drawings to reference like features.

DETAILED DESCRIPTION

User-controlled routing of phone calls to voicemail is discussed herein. In response to an incoming phone call, a user is able to control various functionality regarding ringing of the phone and routing the phone call to voicemail. The user can select from options including having the ringing of his or her phone stopped, increasing the amount of time before the incoming call goes to voicemail, and decreasing the amount of time before the incoming call goes to voicemail. This control can be exercised by the user on a per-call basis at the time of the incoming call. A user interface can be displayed to the user via his or her television and/or mobile phone, as discussed in more detail below.

Figure 1:
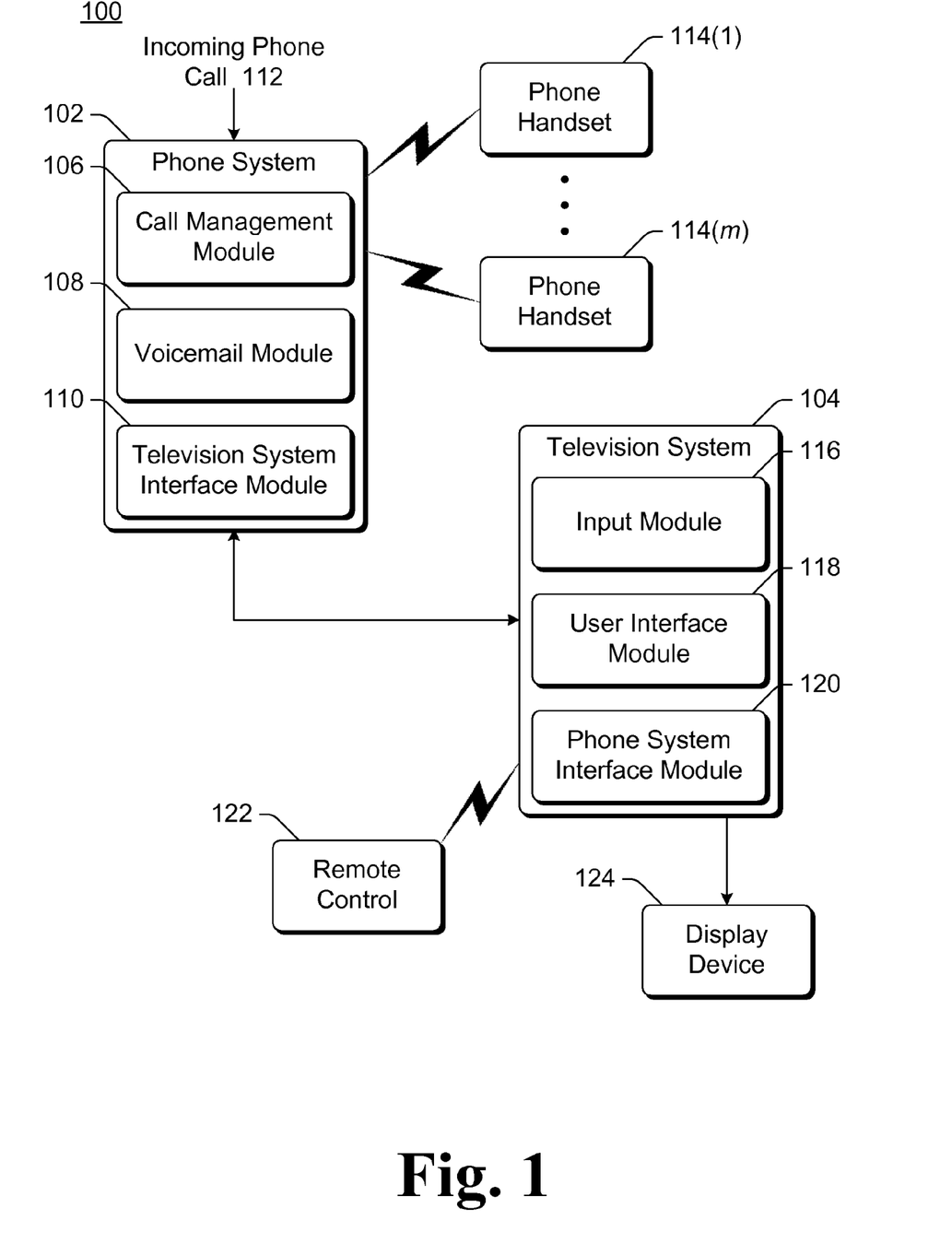
FIG. 1 illustrates an example system implementing the user-controlled routing of phone calls to voicemail in accordance with one or more embodiments.

FIG. 1 illustrates an example system 100 implementing the user-controlled routing of phone calls to voicemail in accordance with one or more embodiments. System 100 includes a phone system 102 and a television system 104. Phone system 102 and television system 104 are typically implemented at the same location, such as in a user's home, although can alternatively be implemented at other locations. Phone system 102 and television system 104 can communicate with one another in a variety of different manners, such as via a network such as a local area network (LAN), an intranet, the Internet, other public and/or proprietary networks, combinations thereof, and so forth. Systems 102 and 104 can also communicate with one another directly using wired or wireless technology.

A single phone system 102 and television system 104 are illustrated in system 100 for ease of explanation. It is to be appreciated, however, that system 100 can include multiple television systems 104 in communication with phone system 102. Similarly, it is to be appreciated that system 100 can include multiple phone systems 102 in communication with one or more television systems 104.

Each of systems 102 and 104 can be implemented on one or more of a variety of different computing devices, including the same types of computing devices or alternatively different types of computing devices. For example, such computing devices can include a desktop computer, a mobile station, an entertainment appliance, a set-top box communicatively coupled to a display device, a wireless phone, a game console, an automotive computer, and so forth. Thus, the computing devices implementing systems 102 and 104 can range from full resource devices with substantial memory and processor resources (e.g., personal computers, game consoles) to low-resource devices with limited memory and/or processing resources (e.g., traditional set-top boxes, hand-held game consoles). Systems 102 and 104 can be implemented on the same or different computing devices.

Phone system 102 includes a call management module 106, a voicemail module 108, and a television system interface module 110. Call management module 106 manages outgoing and incoming phone calls, including incoming phone call 112. Incoming phone call 112 can be received via a variety of different communication media and from a variety of different types of phones. For example, incoming phone call 112 can be received via a public and/or proprietary circuit-switched telephone network (e.g., a public switched telephone network), a packet-based network (e.g., an intranet or the Internet), cellular or other wireless networks, combinations thereof, and so forth.

In response to incoming phone call 112, call management module 106 communicates to one or more (m) phone handset 114(1 ... m) an indication to begin ringing. In response, each handset 114 begins ringing to notify a user of system 100 that an incoming phone call has been received. Additional information can also optionally be communicated to phone handset 114, such as a caller identification (id) of the caller that initiated incoming phone call 112, such as the name of the caller and/or the phone number of the phone used by the caller. Alternatively, phone system 102 can itself ring and/or cause another component or device to ring rather than, or in addition to, causing phone handset 114 to ring. Call management module 106 also sends a notification of incoming call 112 to television system 104. This notification can include a caller id of the caller that initiated incoming phone call 112, and can be displayed to a user of television system 104 as discussed in more detail below.

Call management module 106 typically manages incoming and outgoing phone calls for local handsets such as handsets 114. These local handsets refer to handsets in close physical proximity to phone system 102, such as handsets located in the same home, office, or other building as phone system 102. Phone handsets 114 can communicate with phone system 102 via wired or wireless communication media. Phone handsets 114 are typically designed to work in close physical proximity to telephone system 102, as distinguished from mobile phones (e.g., cellular and other wireless phones) that do not rely on a phone system 102 being in close physical proximity.

Typically, call management module 106 waits for a particular amount of time for a user to answer incoming phone call 112. This particular amount of time is also frequently referred to as a number of rings, such as allowing handset 114 to ring a particular number of times (e.g., four times). If a user does answer incoming phone call 112 within this particular amount of time, then incoming phone call 112 is routed to handset 114 (or another handset used by the user to answer call 112). If a user does not answer incoming phone call 112 within this particular amount of time, then module 106 routes incoming phone call 112 to voicemail module 108. The amount of time that module 106 waits before routing incoming phone call 112 to voicemail module 108 can be increased or decreased in response to a user request, as discussed in more detail below.

Voicemail module 108 manages the storage and retrieval of voice messages. When incoming phone call 112 is routed to voicemail module 108, voicemail module 108 answers the call and allows the caller to leave a voicemail message. Voicemail module 108 can also playback an answer message to the caller. This answer message typically informs the caller that he or she can leave a voicemail message, although other messages can alternatively be played back. Voicemail module 108 records the voicemail message and allows a user of phone system 102 to subsequently retrieve the voicemail message. This retrieval of the voicemail message can be via a handset 114 and/or directly from phone system 102.

Television system interface module 110 is an interface allowing communication with television system 104. Various functionality of phone system 102 can be controlled by a user on a per-call basis via television system 104. Interface module 110 communicates with television system 104 to allow this control, as discussed in more detail below.

Television system 104 includes an input module 116, a user interface (UI) module 118, and a phone system interface module 120. Television system 104 also communicates with a remote control device 122 and a display device 124. Phone system interface module 120 is an interface allowing communication with phone system 102. Interface module 120 communicates with television system interface module 110 to allow a user to control various functionality of phone system 102 on a per-call basis, as discussed in more detail below.

UI module 118 presents an indication of incoming phone call 112 to a user of television system 104. The information displayed in this indication is the information included in the notification of incoming phone call 112 received from phone system 102. UI module 118 typically displays this indication to the user via display device 124, but alternatively module 118 can present the indication in other manners, such as audible outputs.

Input module 116 allows the user to input requests to television system 104. These requests are typically, but need not be, input in response to a presentation of the indication of incoming phone call 112 by UI module 118. Input module 116 can allow user requests to be input in a variety of different manners, such as a selection (e.g., via a touchscreen or pointer and pointer control device) of a menu item or other option displayed by UI module 118 as part of a graphical user interface (GUI), selection of a button or key on a keypad of a device (such as a device implementing system 104, remote control 122, display device 124), verbal commands, and so forth.

Remote control 122 is a device that allows a user to input requests or commands to television system 104. Although only one remote control 122 is illustrated in system 100, it is to be appreciated that multiple remote controls 122 can communicate with system 104. Remote control 122 can communicate with system 104 in a variety of different manners, such as using RF (radio frequency) signals, infrared (IR) signals, or other wireless or wired signals. User requests can be received by remote control 122 in a variety of different manners, such as selection of a button or key on remote control 122, selection of a button via a touchscreen of remote control 122, verbal commands, and so forth. Remote control 122 can also operate as a pointer control device to allow a user to move a pointer displayed by UI module 118 and select an item, button, or other component displayed by module 118.

Display device 124 is a component capable of displaying television programming and/or other video content. Display device 124 can be any type of television, monitor, LCD (liquid crystal display), projector, or similar television-based display system that renders video and/or image data. Display device 124 can be implemented as part of television system 104, or alternatively television system 104 can output a signal to display device 124 which in turn can display the programming and/or other content. In one or more embodiments, display device 124 can also playback audio content. Alternatively, another component or device can playback audio content corresponding to the programming or other video content displayed by device 124.

During operation, in response to incoming phone call 112, call management module 106 sends a notification of incoming phone call 112 to television system 104. This notification is sent via interface modules 110 and 120. The notification sent by call management module 106 can include various information regarding incoming phone call 112 and/or a caller that initiated incoming phone call 112. This information can include, for example, a name of the caller and/or a phone number of a phone from which the phone call 112 was received. Alternatively, the information may merely indicate that incoming phone call 112 has been received, and may not include any identifying information regarding the caller. This received information regarding incoming phone call 112 is displayed on display device 124 by user interface module 118 as an indication of incoming phone call 112.

In response to the incoming phone call 112, a user is able to control various functionality regarding ringing of the phone and routing the phone call to voicemail. A user request to control specific functionality can be received in a variety of different manners. In one or more embodiments, user interface module 118 displays an indication of various options from which the user can select. The user can select one of these options and have the corresponding functionality carried out. In other embodiments, remote control device 122 can have one or more keys or buttons that are associated with different functionality. The user can select one of these buttons or keys to have the associated functionality carried out.

In one or more embodiments, when television system 104 receives an indication of incoming phone call 112 from phone system 102, user interface module 118 displays an indication of the call on display device 124. The indication can include a notification of an incoming phone call, as well as information regarding the incoming phone call that was received from phone system 102. For example, user interface module 118 can display an incoming phone call alert along with the name of the caller and/or the phone number of the phone from which the call was received.

User interface module 118 can display the notification and other information regarding the phone call concurrently with other programming content, or alternatively separately. For example, the notification and other information regarding the incoming phone call can be displayed in a separate portion of a display (e.g., a picture-in-picture window, a top or bottom banner, etc.) concurrently with whatever other television program or other video content is being displayed by television system 104. By way of another example, the notification and other information regarding the incoming phone call can be displayed as an overlay on whatever other television program or other video content is being displayed by television system 104. By way of yet another example, the display of the television program or other video content being watched by a user can be paused in response to incoming phone call 112, and the notification and other information regarding the phone call can be displayed on the display by itself.

It is to be appreciated that as different incoming phone calls can be received from different callers and different phones, the information regarding the incoming phone call can be different for different incoming phone calls. The information regarding a particular incoming phone call is displayed to the user, allowing the user to identify various functionality regarding control of that phone call on a per-call basis.

A variety of different functionality regarding control of incoming phone call 112 can be controlled by a user of television system 104. In one or more embodiments, this different functionality includes one or more of: delaying the incoming phone call from being routed to voicemail, having the incoming phone call routed to voicemail more quickly, and stopping ringing of one or more phone handsets 114. These functionalities are discussed in more detail below.

Delaying the incoming phone call from being routed to voicemail increases the amount of time (or the number of rings) that call management module 106 waits before routing incoming phone call 112 to voicemail module 108. The duration of the delay can be a fixed amount, or alternatively can be a variable amount. For example, a user preference could be set that identifies the duration of the delay, multiple options corresponding to different delay durations can be presented to the user and the user can select from those multiple options on a per-call basis, a single option can be displayed to the user and the duration of the delay can be pre-configured in call management module 106, and so forth.

When the user requests delaying the incoming phone call, input module 116 receives the request and communicates the request to call management module 106 via interface modules 110 and 120. In response to the delay request, call management module 106 delays routing the incoming phone call to voicemail. In one or more embodiments, the duration of this delay can be a finite amount identified in different manners as discussed above. Alternatively, the duration of this delay can be infinite. For an infinite duration, call management module 106 does not route incoming phone call 112 to voicemail module 108. Rather, call management module 106 allows incoming phone call 112 to continue ringing (or answers the call and waits) until a user of system 100 answers the phone call or the caller hangs up. Additionally, in response to the delay request, the ringing of phone system 102 and/or phone handset 114 stops In one or more embodiments, an answer message is communicated to the caller. A variety of different answer messages can be played back to the caller, such as a message informing the caller that the user will be answering the phone call but that it will take him or her a little longer than normal. This notifies the caller that a delay will occur before the call is answered by the user. Call management module 106 communicates the answer message to the caller by answering the phone call and playing a recorded message to the caller. Call management module 106 then keeps the call holding until the user answers the call via a phone handset 114 or the caller hangs up.

In one or more embodiments, the user is also able to select a particular answer message to be sent to the caller. Different messages can be selected by the user in different manners, such as user interface module 118 displaying multiple options to the user and allowing the user to select therefrom. Different messages can also be selected in different manners, such as by allowing the user to input a particular verbal message via remote control 122. When a particular message is selected by the user, input module 116 sends an identification of the particular message (or the particular message itself) to call management module 106, which in turn plays back the particular message to the caller. The different messages from which the user can select can be previously recorded and stored by call management module 106 or alternatively by other components or modules, or alternatively can be input by the user in response to the notification of the incoming call 112.

Delaying incoming phone call 112 going to voicemail allows various usage scenarios. For example, assume a user of system 100 is relaxing on his or her sofa and watching television. The user may thus have remote control 122 within easy reach, but not phone handset 114. In response to incoming phone call 112, an identifier of the caller is displayed to the user by the user's television. If the user desires to answer the phone call but realizes that phone handset 114 is too far away for him or her to get to quickly, the user can use remote control 122 to request delaying routing incoming phone call 112 to voicemail. This delay gives the user additional time to get up and locate the phone handset 114 in order to answer incoming phone call 112.

Alternatively, rather than delaying the incoming phone call from being routed to voicemail, the user could request to have the incoming phone call routed to voicemail more quickly. This routing of the incoming phone call to voicemail more quickly can also be referred to as routing or sending the incoming phone call straight to voicemail. Having an incoming phone call routed to voicemail more quickly decreases the amount of time (or the number of rings) that call management module 106 waits before routing incoming phone call 112 to voicemail module 108. The user can request having the incoming phone call routed voicemail more quickly in different manners, such as by selecting an option displayed by user interface module 118 or a button or key of remote control 122 requesting to send the phone call straight to voicemail. When the user requests having the incoming phone call routed to voicemail more quickly, input module 116 receives the request and communicates the request to call management module 106 via interface modules 110 and 120. In response to the request, call management module 106 routes incoming phone call 112 to voicemail module 108 without further delay. The particular amount of time that module 106 would typically wait before routing incoming phone call 112 to module 108 is not waited for in response to the user request. Additionally, when incoming phone call 112 is routed to voicemail module 108, the ringing of phone system 102 and/or phone handset 114 stops.

In one or more embodiments, an answer message is played back to the caller when incoming phone call 112 is being routed to voicemail module 108 without further delay. A variety of different answer messages can be communicated to the caller, such as a message informing the caller that the user is not able to currently answer the phone call. Call management module 106 communicates the message to the caller by answering the phone call and playing a recorded message to the caller. Alternatively, call management module 106 can route the call to voicemail module 108, and module 108 can answer the call and play the recorded message to the caller.

In one or more embodiments, the user is also able to select a particular answer message to be sent to the caller. Different answer messages can be selected by the user in different manners, such as user interface module 118 displaying multiple options to the user and allowing the user to select therefrom. Different messages can also be selected in different manners, such as by allowing the user to input a particular verbal message via remote control 122. When a particular message is selected by the user, input module 116 sends an identification of the particular message (or the particular message itself) to call management module 106 (or voicemail module 108), which in turn plays back the particular message to the caller. The different messages from which the user can select can be previously recorded and stored by call management module 106 (or voicemail module 108) or alternatively by other components or modules, or alternatively can be input by the user in response to the notification of the incoming call 112.

Allowing the user to request sending incoming phone call 112 straight to voicemail allows various usage scenarios. For example, assume a user of system 100 is relaxing on his or her sofa and watching television. The user may thus have remote control 122 within easy reach, but not phone handset 114. In response to incoming phone call 112, an identifier of the caller is displayed to the user by the user's television. If the user does not desire to answer the incoming call 112, the user can request that the incoming call be sent straight to voicemail. This allows the user to have the incoming call 112 routed to voicemail without having to locate phone handset 114.

Additional functionality that can be controlled by the user is to stop ringing of the phone handsets 114, which can also include stopping ringing of phone system 102. Stopping ringing of one or more phone handsets 114 causes the ringing of handsets 114 and/or phone system 102 due to incoming phone call 112 to stop. However, stopping ringing of one or more phone handsets 114 need not increase or decrease the amount of time that call management module 106 waits before routing incoming phone call 112 to voicemail module 108. When the user requests that the ringing of one or more handsets 114 stops, input module 116 receives the request and communicates the request to call management module 106 via interface module 110 and 120. In response to the stop ringing request, call management module 106 stops the ringing due to incoming phone call 112. This stopping of the ringing due to incoming phone call 112 can include sending an indication to phone handsets 114 to turn off ringing, turning off ringing on system 102 itself, and/or sending an indication to one or more other devices or components to turn off ringing.

The particular handsets 114 that are stopped ringing can be determined in different manners. In one or more embodiments, ringing of all handsets 114 and ringing of phone system 102 and/or any other components or modules is stopped. Alternatively, ringing of a particular one or more handsets 114 can be stopped while ringing of one or more other handsets 114 continues.

In one or more embodiments, each handset 114 is associated with one of multiple television systems 104. This association of handsets 114 to television systems 104 is maintained by phone system 102, such as by call management module 106. When a request to stop ringing the handset 114 is received, phone system 102 identifies the television system 104 from which the request was received. This television system 104 can be identified in different manners, such as based on the communication channel between phone system 102 and television system 104 (e.g., each television system 104 may communicate with phone system 102 via a different communication channel), based on an identifier of television system 104 received from television system 104, and so forth. In response to the request to stop ringing the handset 114, phone system 102 identifies the one or more handsets associated with the television system 104 from which the request was received, and stops ringing of those one or more associated handsets 114.

By way of example, each room of a home can have a television system 104 and an associated handset 114. In response to incoming phone call 112, call management module 106 can send an indication to all handsets 114 to start ringing. If a user in one room of the house requests that the handset 114 stops ringing, then call management module 106 sends an indication to the handset 114 located in that one room to stop ringing. The other handsets 114 in the other rooms, however, continue ringing.

Multiple different stopping ringing of handsets 114 functionality can be made available to the user. For example, the user can optionally be presented with different "stop ringing" options, such as a "stop ringing in my room only" option, "stop all ringing", and so forth. If the "stop ringing in my room only" option is selected by the user, then the ringing of the handset 114 in his or her room stops but the ringing of other handsets 114 continues. However, if the "stop all ringing" option is selected, then the ringing of all handsets 114 is stopped.

The request to stop ringing of one or more handsets 114 can also be inherent in one or more other requests. For example, the request to stop ringing can be inherent in a request to delay incoming phone call 112 from being routed to voicemail as discussed above, and/or can be inherent in a request to have incoming phone call 112 routed to voicemail more quickly as discussed above.

It should be noted that although system 100 is discussed herein primarily as including a television system 104, alternatively other systems other than a television system can be in communication with phone system 102. These other systems can implement the functionality of the user-controlled routing of phone calls to voicemail that is described herein as being performed by television system 104. The functionality of system 104 could be implemented in a variety of different systems, such as a kitchen appliance or other household appliance regardless of whether the appliance are capable of displaying television programming (e.g., a toaster, a refrigerator, an alarm clock, a lamp, etc.), a printer or other computing device, and so forth. Any of these different systems could have an input device (e.g., buttons, keys, a remote control, etc.) that is in closer proximity to the user than phone handset 114 when incoming phone call 112 is received. By implementing the user-controlled routing of phone calls to voicemail in such a different system, the user is able to control incoming phone calls on a per-call basis as discussed herein via this different system rather than needing immediate access to a phone handset 114 and/or phone system 102.

It should also be noted that information regarding a caller need not be displayed by television system 104 (or by a different system implementing the user-controlled routing of phone calls to voicemail discussed herein). Rather, the user can control routing of phone calls without knowledge of who the caller is, or based on knowledge of the caller presented by phone system 102 and/or phone handsets 114 (e.g., via a different ring tone, via an audible announcement of the caller information, and so forth). This allows a system implementing the functionality of television system 104 to accept inputs from a user regarding routing of phone calls, but need not display or otherwise present any information to the user. For example, a lamp, a refrigerator, or other appliance could have no display for presenting information regarding the caller, but could have one or more buttons or keys allowing a user to input requests to control the routing of phone calls.

Figure 2:
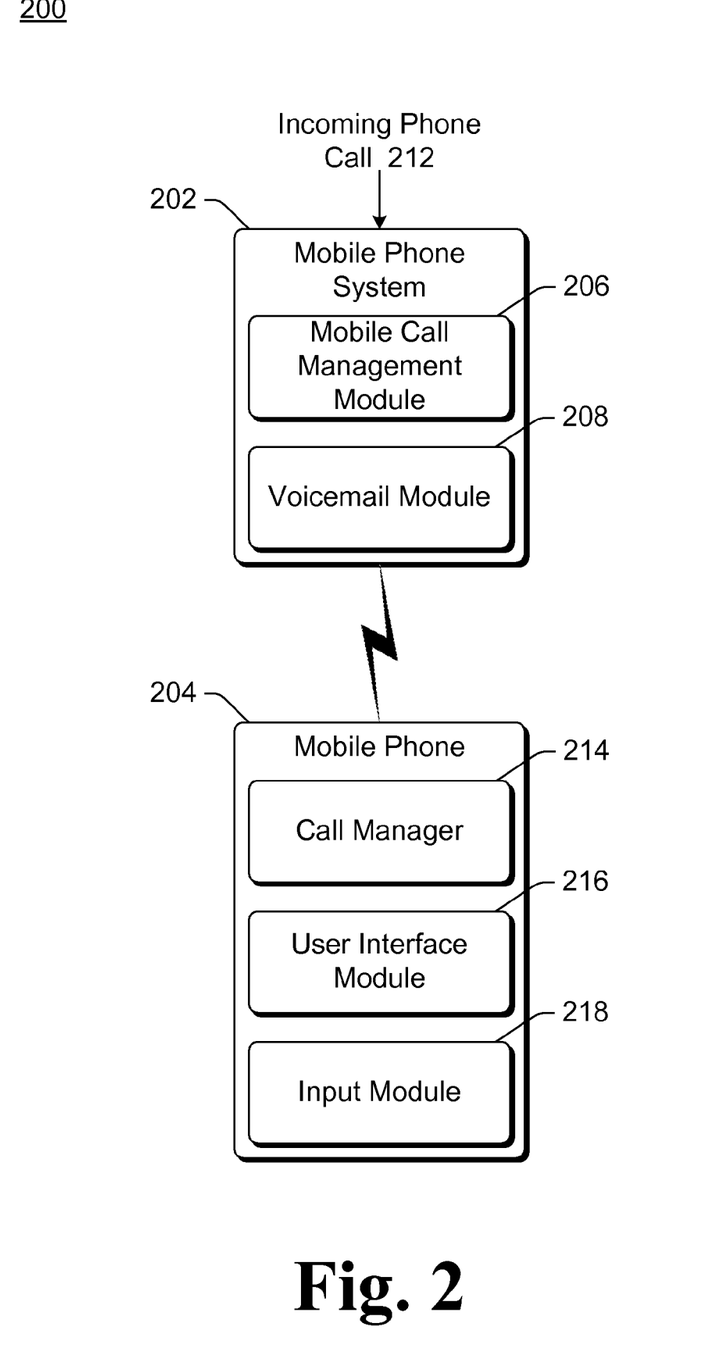
FIG. 2 illustrates an example system implementing the user-controlled routing of phone calls to voicemail in accordance with one or more embodiments.

FIG. 2 illustrates an example system 200 implementing the user-controlled routing of phone calls to voicemail in accordance with one or more embodiments. System 200 includes a mobile phone system 202 and a mobile phone 204. Mobile phone system 202 is similar to phone system 102 of FIG. 1, although mobile phone system 202 manages phone calls with one or more mobile phones 204 rather than with phone handsets. Mobile phone system 202 can manage mobile phone 204 in accordance with a variety of variety of different public and/or proprietary communications protocols. Mobile phone 204 can be, for example, a cellular phone.

A single mobile phone system 202 and mobile phone 204 are illustrated in system 200 for ease of explanation. It is to be appreciated, however, that system 200 can include multiple mobile phones 204 in communication with mobile phone system 202. Similarly, it is to be appreciated that system 200 can include multiple mobile phone systems 202 in communication with one or more mobile phones 204.

Mobile phone system 202 can be implemented on one or more of a variety of different computing devices, analogous to system 102 of FIG. 1. Mobile phone 204 can be implemented as any of a variety of mobile communications devices, including cellular, satellite, or other wireless phones, personal digital assistants (PDAs), and so forth.

Mobile phone system 202 includes a mobile call management module 206 and a voicemail module 208. Call management module 206 manages outgoing and incoming mobile phone calls, including incoming phone call 212. Incoming phone call 212 can be received via a variety of different communication media and from a variety of different types of phones, analogous to incoming phone call 112 of FIG. 1.

In response to incoming phone call 212, mobile call management module 206 communicates an indication to mobile phone 204 to begin ringing. In response, mobile phone 204 begins ringing to notify a user of system 200 that an incoming phone call has been received. Additional information can also optionally be communicated to mobile phone 204, such as a caller id of the caller that initiated incoming phone call 212, such as the name of the caller and/or the phone number of the phone used by the caller.

Call management module 206 typically manages incoming and outgoing phone calls for one or more mobile phones 204. Typically, call management module 206 waits for a particular amount of time (or number of rings) for a user to answer incoming phone call 212. If a user does answer incoming phone call 212 within this particular amount of time, then incoming phone call 212 is routed to mobile phone 204. If a user does not answer incoming phone call 212 within this particular amount of time, then module 206 routes incoming phone call 212 to voicemail module 208. Voicemail module 208 manages the storage and retrieval of voice messages, analogous to voicemail module 108 of FIG. 1. The amount of time that module 206 waits before routing incoming phone call 212 to voicemail module 208 can be increased or decreased in response to a user request, as discussed in more detail below.

Mobile phone 204 includes a call manager 214, a user interface module 216, and an input module 218. Call manager 214 manages incoming and outgoing phone calls for mobile phone 204, communicating with mobile call management module 206 to perform this management. User interface module 216 presents information regarding incoming phone call 212 to a user of mobile phone 204, analogous to user interface module 118 of FIG. 1. UI module 216 typically displays this information to the user via a screen or other display device of mobile phone 204, but alternatively module 216 can present the information in other manners, such as audible outputs.

Input module 218 allows the user to input requests to mobile phone 204. These requests are typically, but need not be, input in response to a presentation of information by UI module 216. Input module 218 can allow user requests to be input in a variety of different manners, such as a selection (e.g., via a touchscreen or pointer and pointer control device) of a menu item or other option displayed by UI module 216 as part of a graphical user interface (GUI), selection of a button or key on a keypad of mobile phone 204, verbal commands, and so forth.

During operation, in response to incoming phone call 212, call management module 206 sends an indication of incoming phone call 212 to mobile phone 204. The indication sent by call management module 206 can include various information regarding incoming phone call 212 and/or a caller that initiated incoming phone call 212. This information can include, for example, a name of the caller and/or a phone number of a phone from which the phone call 212 was received. This received information regarding incoming phone call 212 is displayed or otherwise presented to the user by user interface module 216.

In response to the incoming phone call 212, a user is able to control various functionality regarding ringing of the phone and routing the phone call to voicemail, analogous to the discussion above regarding system 100 of FIG. 1. A user request to control specific functionality can be received in a variety of different manners. In one or more embodiments, user interface module 216 displays an indication of various options from which the user can select. The user can select one of these options and have the corresponding functionality carried out. In other embodiments, mobile phone 204 can have one or more keys or buttons that are associated with different functionality. The user can select one of these buttons or keys to have the associated functionality carried out.

Delaying incoming phone call 212 from being routed to voicemail is functionality that can be requested by a user of mobile phone 204. This delaying of the incoming phone call being routed to voicemail is analogous to the delaying of the incoming phone call 112 of FIG. 1 being routed to voicemail as discussed above. As such, the various discussions of delaying incoming phone call 112 above apply to delaying incoming phone call 212 as well. However, it should be noted that in system 200 the request to delay the incoming phone call being routed to voicemail is received from a mobile phone rather than from a television system. Additionally, an answer message can be communicated to the caller as discussed above, such as a message informing the caller that the user will be answering the phone call but that it will take him or her a little longer than normal.

In one or more embodiments, in response to the user requesting delaying routing incoming phone call 212 to voicemail, ringing of mobile phone 204 is also stopped. Mobile phone 204 can detect the request to delay routing incoming phone call 212 to voicemail and stop ringing in response to the request, or alternatively can receive an indication from mobile phone system 202 to stop ringing. Thus, mobile phone 204 would no longer ring while the user takes time to answer the phone call.

Delaying incoming phone call 212 going to voicemail allows various usage scenarios. For example, assume a user of system 200 is in a meeting or at a concert. In response to incoming phone call 212, an identifier of the caller is displayed on the user's mobile phone 204. If the user desires to answer the phone call but realizes that he or she cannot leave the meeting or concert and quickly get to a location where he or she can talk, the user can request delaying routing incoming phone call 212 to voicemail. This delay gives the user additional time to get to a location where he or she can talk before answering incoming phone call 212.

Figure 3:
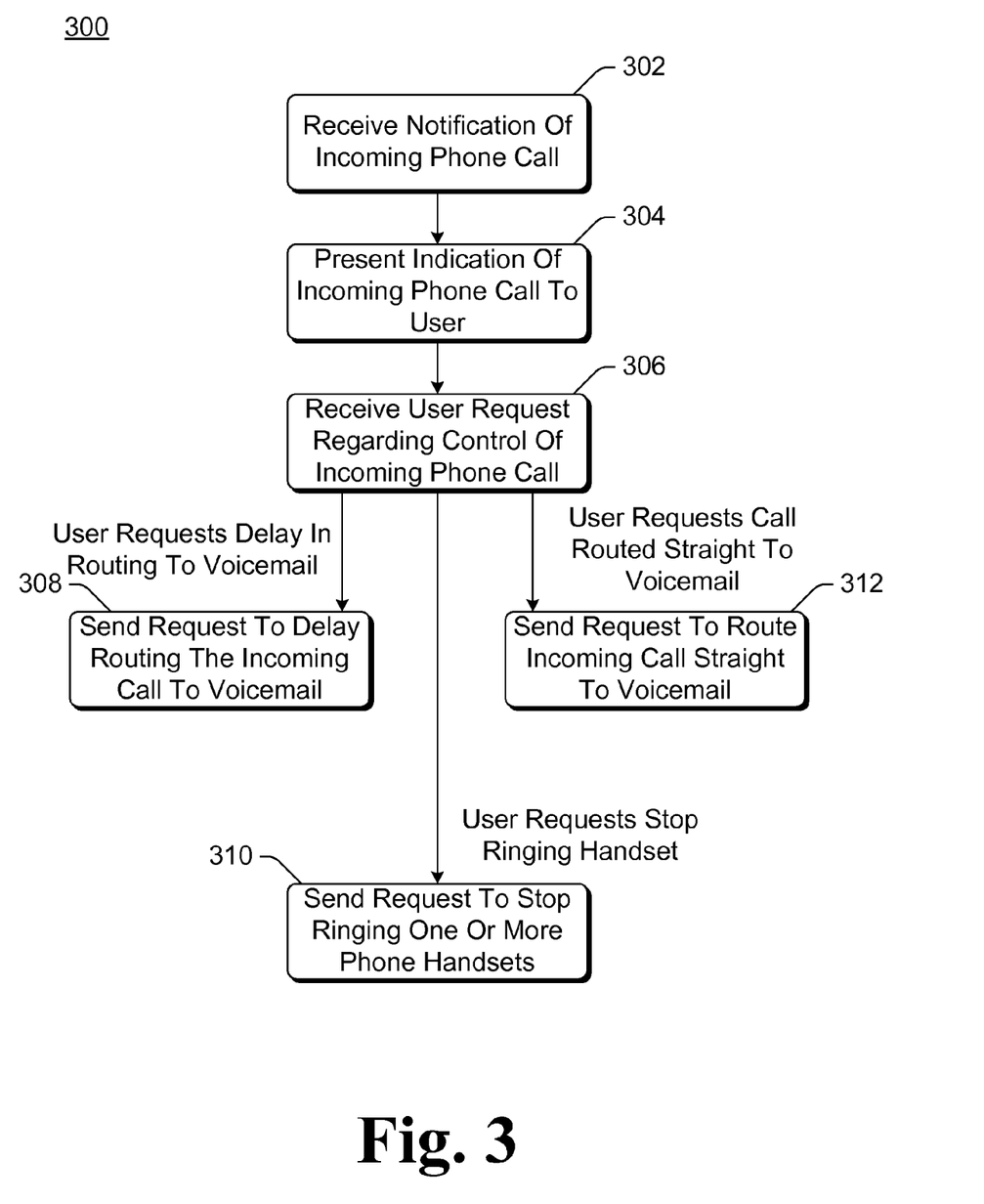
FIG. 3 is a flowchart illustrating an example process for a device implementing the user-controlled routing of phone calls to voicemail in accordance with one or more embodiments.

FIG. 3 is a flowchart illustrating an example process 300 for a device implementing the user-controlled routing of phone calls to voicemail in accordance with one or more embodiments. Process 300 is carried out by one or more devices, and can be implemented in software, firmware, hardware, or combinations thereof. Process 300 can be carried out, for example by television system 104 of FIG. 1 or mobile phone 204 of FIG. 2. Process 300 is an example process for user-controlled routing of phone calls to voicemail; additional discussions of user-controlled routing of phone calls to voicemail are included herein with reference to different figures.

In process 300, a notification of an incoming phone call is received (act 302), and an indication of the incoming phone call is presented to the user (act 304). As discussed above, this presentation can take a variety of different forms, such as displaying a name of a caller that initiated the incoming call and/or a phone number of a phone from which the incoming call was initiated. Also as discussed above, an indication need not be presented to the user by the device implementing process 300 (e.g., such an indication can be presented by the telephone system and/or a phone handset).

A user request regarding control of the incoming call is received (act 306). As discussed above, a variety of different functionality regarding control of an incoming phone call can be controlled by a user, such as delaying the incoming phone call from being routed to voicemail, having the incoming phone call routed to voicemail more quickly, and stopping ringing of one or more phone handsets. Process 300 proceeds based on the particular user request received.

If a user requests that routing of the incoming phone to voicemail be delayed, then a request to delay routing the incoming phone call to voicemail is sent (act 308). This request is sent to a management module that manages the phone calls (e.g., call management module 106 of FIG. 1, or mobile call management module 206 of FIG. 2).

If a user requests that the handset stops ringing, then a request to stop ringing one or more handsets is sent (act 310). As discussed above, ringing of one or more handsets can be stopped in response to the request. Analogous to act 308, this request is sent to a management module that manages the phone calls.

If a user requests to have the incoming phone call routed straight to voicemail, then a request to route the incoming call straight to voicemail is sent (act 312). As discussed above, this results in the incoming call being routed to a voicemail module without further delay. Analogous to act 308, this request is sent to a management module that manages the phone calls.

Figure 4:
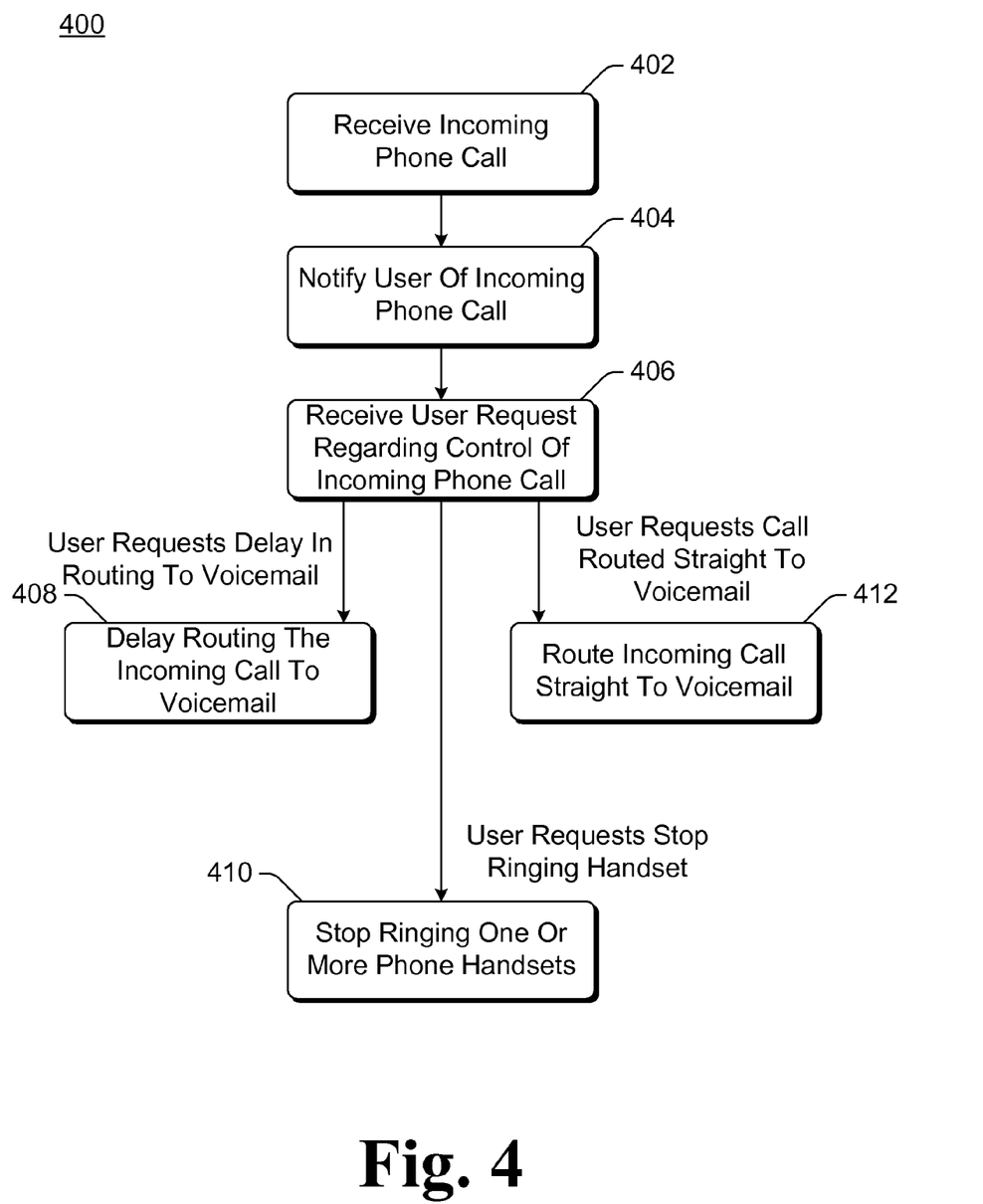
FIG. 4 is a flowchart illustrating another example process for a device implementing the user-controlled routing of phone calls to voicemail in accordance with one or more embodiments.

FIG. 4 is a flowchart illustrating another example process 400 for a device implementing the user-controlled routing of phone calls to voicemail in accordance with one or more embodiments. Process 400 is carried out by one or more devices, and can be implemented in software, firmware, hardware, or combinations thereof. Process 400 can be carried out, for example by phone system 102 of FIG. 1 or mobile phone system 202 of FIG. 2. Process 400 is an example process for user-controlled routing of phone calls to voicemail; additional discussions of user-controlled routing of phone calls to voicemail are included herein with reference to different figures.

In process 400, an incoming phone call is received (act 402), and a user is notified of the incoming phone call (act 404). The user can be notified of the incoming phone call via his or her mobile phone or television system, as discussed above.

A user request regarding control of the incoming call is received (act 406). This request can be received from a television system or a mobile phone, as discussed above. Also as discussed above, a variety of different functionality regarding control of an incoming phone call can be controlled by a user, such as delaying the incoming phone call from being routed to voicemail, having the incoming phone call routed to voicemail more quickly, and stopping ringing of one or more phone handsets. Process 400 proceeds based on the particular user request received.

If a user requests that routing of the incoming phone to voicemail be delayed, then routing of the incoming phone call to voicemail is delayed (act 408). An answer message can also optionally be played back to the caller that initiated the incoming phone call, as discussed above.

If a user requests that the handset stops ringing, then ringing of one or more handsets is stopped (act 410). This stopping of ringing can be for all handsets or multiple handsets, as discussed above.

If a user requests to have the incoming phone call routed straight to voicemail, then the incoming call is routed to voicemail without further delay (act 412). An answer message can also optionally be played back to the caller that initiated the incoming phone call, as discussed above.

Figure 5:
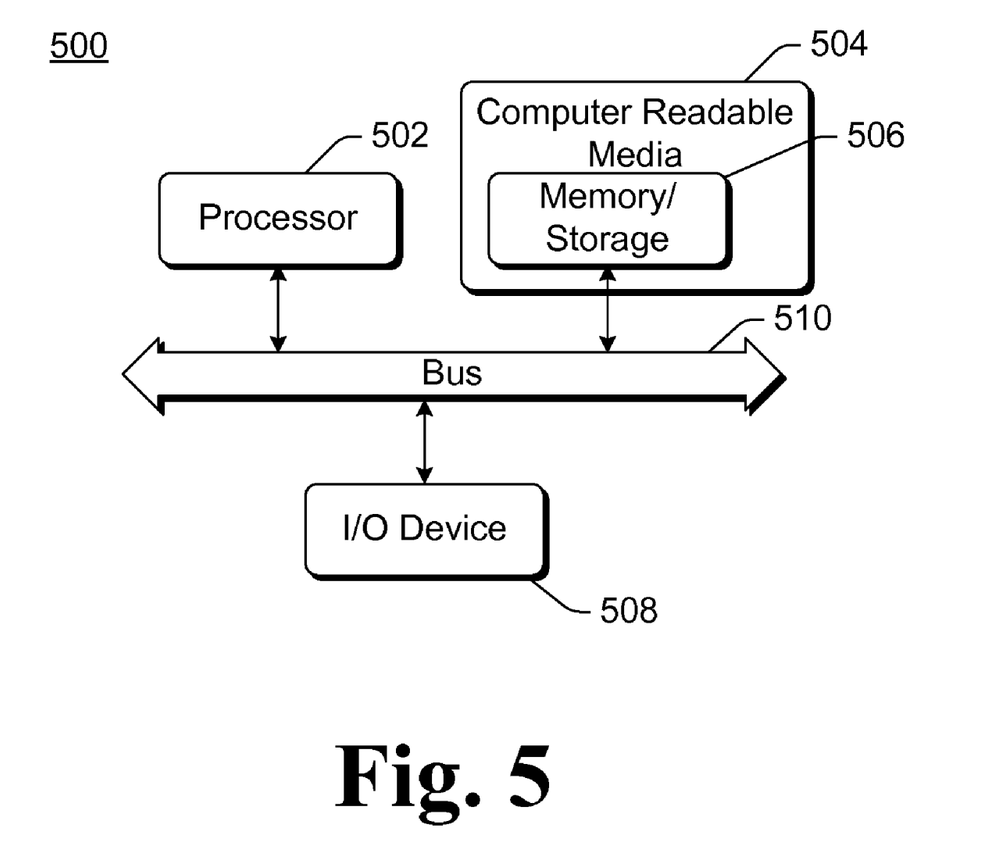
FIG. 5 illustrates an example computing device that can be configured to implement the user-controlled routing of phone calls to voicemail in accordance with one or more embodiments.

FIG. 5 illustrates an example computing device 500 that can be configured to implement the user-controlled routing of phone calls to voicemail in accordance with one or more embodiments. Computing device 500 can implement, for example, phone system 102 or television system 104 of FIG. 1, mobile phone system 202 or mobile phone 204 of FIG. 2, and so forth.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or non-volatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the user-controlled routing of phone calls to voicemail techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a television system, the method comprising:
  receiving, from a phone system, a notification of an incoming phone call;
  receiving, from a user, a request to delay the incoming phone call from being routed to voicemail, the request identifying a duration of time for which to delay routing the incoming phone call to voicemail;
  receiving a user selection of one of multiple answer messages;
  sending, to the phone system, a request to delay routing the incoming phone call to voicemail until expiration of the duration of time and sending an identification of the selected answer message to the phone system for playback to a caller that initiated the incoming phone call while routing of the incoming phone call to voicemail is being delayed.

2. A method as recited in claim 1, wherein the method is implemented in a mobile phone.

3. A method as recited in claim 2, wherein the request to delay the incoming phone call from being routed to voicemail is also a request to stop ringing the mobile phone.

4. A method as recited in claim 1, wherein receiving the request from the user comprises receiving the request from the user via a remote control of the television system.

5. A method as recited in claim 1, further comprising displaying caller id information regarding a caller that initiated the incoming phone call.

6. A method as recited in claim 1, wherein the request to delay routing the incoming phone call to voicemail is a request to delay routing the incoming phone call to voicemail for a finite amount of time.

7. A method as recited in claim 1, wherein the request to delay routing the incoming phone call is also a request to stop ringing one or more phone handsets.

8. A method as recited in claim 7, wherein the method is implemented in a television system, and wherein the one or more phone handsets are one or more phone handsets located in a same room as the television system.

9. A method as recited in claim 1, further comprising:
receiving, from the phone system, a second notification of a second incoming phone call;
receiving, from the user, a request to route the second incoming phone call straight to voicemail; and
sending, to the phone system, a request to route the second incoming phone call to voicemail without further delay.

10. A method as recited in claim 9, further comprising:
receiving, from the phone system, a third notification of a third incoming phone call;
receiving, from the user, a request to stop ringing one or more phone handsets; and
sending, to the phone system, a request to stop ringing one or more phone handsets of the phone system.

11. A television system comprising:
a phone system interface configured by a phone system interface module, embodied on a computer storage media, to communicate with a phone system located at a same location as the television system, and to receive a notification of an incoming phone call from the phone system;
a user interface configured by a user interface module, embodied on the computer storage media, to display, in response to receiving the notification of the incoming phone call, an indication of the incoming phone call, the user interface module further configured to display the notification of the incoming phone call concurrently with television programming being displayed by the television system, the user interface module further configured to display multiple answer messages; and
an input module, embodied on the computer storage media, the input module configured to receive a user request to route the incoming phone call straight to voicemail, and to communicate to the phone system via the phone system interface module a request to route the incoming phone call to voicemail without further delay, the input module being further configured to receive a user selection of one of the multiple answer messages and send an identification of the selected answer message to the phone system for playback to a caller that initiated the incoming phone call.

12. A television system as recited in claim 11, wherein:
the phone system interface module is further to receive a second notification of a second incoming phone call from the phone system;
the user interface module is further to display, in response to receiving the second notification, a second indication of the second incoming phone call; and
the input module is further to receive a user request to delay routing the second incoming phone call to voicemail, and to communicate to the phone system via the phone system interface module a request to delay routing the second incoming phone call to voicemail.

13. A television system as recited in claim 12, wherein the request to delay routing the second incoming phone call to voicemail is a request to delay routing the second incoming phone call to voicemail for an infinite duration.

14. A television system as recited in claim 11, wherein the input module receives the user request via a remote control device in communication with the television system.

15. A television system as recited in claim 11, wherein the request to route the incoming phone call straight to voicemail is also a request to stop ringing one or more phone handsets of the phone system.

16. One or more tangible computer storage medium having stored thereon multiple instructions that, when executed by one or more processors of a television system, cause the one or more processors to:
receive, from a phone system, a notification of an incoming phone call;
display the notification of the incoming phone call, the notification including an identification of a caller that initiated the incoming phone call;
receive a user request identifying how to control the incoming phone call, wherein a user can select from a first option to delay the incoming phone call from being routed to voicemail, a second option to route the incoming phone call straight to voicemail, and a third option to stop ringing of one or more phone handsets;
send to the phone system, in response to a user selection of the first option, a request to delay routing the incoming phone call to voicemail;
send to the phone system, in response to a user selection of the second option, a request to route the incoming phone call to voicemail without further delay; and
send to the phone system, in response to a user selection of the third option, a request to stop ringing of one or more phone handsets of the phone system.

17. One or more tangible computer storage medium as recited in claim 16, wherein the one or more phone handsets comprise one or more phone handsets located in a same room as the television system.

* * * * *